(12) United States Patent
Taniguchi et al.

(10) Patent No.: US 6,219,933 B1
(45) Date of Patent: Apr. 24, 2001

(54) CONTAINER FOR FLUID AND FLUID LEVEL DETECTOR USING THE SAME

(75) Inventors: Naoyuki Taniguchi; Takahiro Wakayama, both of Inashiki-gun (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 09/084,983

(22) Filed: May 28, 1998

(30) Foreign Application Priority Data

Jun. 6, 1997 (JP) .................................................. 9-149337

(51) Int. Cl.[7] .............................. B41J 2/195; B41J 2/175
(52) U.S. Cl. ...................................... 34/7; 347/85; 347/86
(58) Field of Search ................................... 347/7, 19, 86, 347/85, 84, 91, 93

(56) References Cited

U.S. PATENT DOCUMENTS

| 5,315,317 | * | 5/1994 | Terasawa et al. | 347/7 |
| 5,434,603 | * | 7/1995 | Hunt | 347/7 |
| 5,729,256 | * | 3/1998 | Yamanaka et al. | 347/7 |

* cited by examiner

Primary Examiner—John Barlow
Assistant Examiner—Charles W. Stewart
(74) Attorney, Agent, or Firm—Kanesaka &Takeuchi (57) ABSTRACT

A container for a fluid includes a carton of a long hollow shape having an inner surface, and an inner bag attached to the inner surface of the carton for containing the fluid in it. The flexible inner bag has a fluid-discharge port. The inner bag is separated from the carton according to discharging of the fluid. The container also includes a separation detecting device. This device is disposed along a separating direction of the inner bag, which is separated according to taking out of the fluid.

14 Claims, 9 Drawing Sheets

CONTAINER FOR FLUID AND FLUID LEVEL DETECTOR USING THE SAME

BACKGROUND OF THE INVENTION

The present invention concerns a bag-in-carton type container which comprises a carton and a flexible inner bag bonded to the inner surface of the carton for storing a fluid inside, and also a fluid level detector for detecting the fluid quantity remained in the container.

A bag-in-carton used as a container for a liquid is usually in the shape of approximately rectangular parallelepiped. The inner bag is bonded to four side surfaces of the carton. The bag-in-carton is generally used as a container for a low-viscosity liquid such as juice or liqueur.

An ink cartridge disclosed in Japanese Patent Publication No. 93/16968 is for use in storing a high-viscosity liquid like an ink and so on. While the high-viscosity liquid is taken out of the cartridge by sucking with a pump and so on, an inner bag deforms according to the sucking.

When the inner bag deforms, the bag pulls a display tape that covers an opening of the cartridge. As the tape is pulled and separated from the opening, an area of the opening that is not covered by the tape changes, so that the amount of the ink contained in the inner bag can be confirmed visually.

Further, a light-emitting device and a light-detecting device electrically detect the state in which the tape covers the opening. When the amount of the ink is below a certain level, this fact is displayed on a display panel.

However, according to the conventional way of detecting the amount of ink, it is required that the opening stated above is formed on the ink cartridge to confirm the amount of the ink.

In the case where the opening is thus formed on the cartridge, the carton may deteriorate in rigidity and be damaged by shocks caused in conveyance and so on.

Further, the electrical detecting of the amount can be conducted only when the ink is below the certain level. Therefore, in such a case where a large amount of printing is conducted by a printer and the printer is controlled by a remote computer, there is some fear that printing stops on complete consumption of the ink. Hence, if the detecting is not conducted before starting of printing, printing duly starts and continues. Further, if the detecting is conducted during printing, the ink may be consumed before completion of printing. This may waste time if an operator is not aware of the situation.

Further, according to the constitution thus stated, the ink cartridge can not be precisely detected to be empty. Since the cartridge emptiness is detected by judging the separation state of the display tape, a display of emptiness can be possible on the printer side when the ink is actually consumed. This deteriorates efficiency in operating the printer.

A generalized printing apparatus does not detect the amount of ink stored in a cartridge. The apparatus detects the diameter of ink-whirl inside the apparatus by measuring the capacitance thereof. When the amount of the ink is not sufficient, supplementary ink is sucked and supplied. When ink-shortage continues for some ten seconds, the apparatus judges that the ink is empty and this is then displayed.

Therefore, even in the case where an operator sets an empty ink cartridge inside the apparatus by mistake, time of some ten seconds is required until the apparatus detects this fault. Consequently, if the apparatus starts to operate in this condition, spoilage sheets may be sent out due to an ink shortage.

Further, type of ink used for printing has been increased recently and also many types of ink cartridge are provided according to the types of the ink. However, said ink cartridges can not detect the types of the ink.

SUMMARY OF THE INVENTION

The present invention is made to solve the above described various problems. It is the object of the present invention to provide a fluid level detector using a fluid container of a bag-in-carton type. The detector can detect the fluid level in the carton without deteriorating the rigidity of the carton and also can detect an error setting of consumed cartridge and the like, so that efficiency in operating the printing apparatus is not deteriorated.

In order to achieve the above-mentioned object, in the first aspect of the present invention, there is provided a container for a fluid comprising a hollow carton having an inner surface, an flexible inner bag attached to the inner surface of the carton for containing the fluid therein, the inner bag having a discharge port for discharging the fluid and capable of being separated in a certain separating direction from the inner surface of the carton according to the discharging of the fluid through the discharge port, separation detecting means disposed along the separating direction which is separated from the inner surface according to the discharging.

A container for a fluid as defined in the second aspect of the present invention is of such a constitution that, in the first aspect of the present invention, the carton is in a cylindrical shape having an opening on one end thereof, the discharge port of the inner bag is disposed at the opening of the carton, and the separating direction is parallel to the axis of the carton.

In order to achieve the above-mentioned object, in the third aspect of the present invention, there is provided a container for a fluid comprising a substantially box shaped carton consisting of plane surfaces, a discharge port disposed on a surface of the carton, a flexible inner bag disposed inside the carton for containing the fluid therein, the inner bag being connected to the discharge port, the inner bag being attached to the carton in a substantially whole area of a pair of side surfaces which are facing each other and adjacent to a surface where the discharge port is disposed, and capable of being separated from the side surfaces in a certain separating direction according to the discharging, and separation detecting means disposed along the separating direction.

A container for a fluid defined in the fourth aspect of the present invention is of such a constitution that, in the third aspect of the present invention, the separation detecting means includes printed circuit patterns which have certain resistances respectively and terminal portions commonly, the printed circuit patterns being disposed in a parallel-connected manner on one of the side surfaces so that the printed circuit patterns are disconnected successively according to the separation of the inner bag.

A container for a fluid defined in the fifth aspect of the present invention is of such a constitution that, in the fourth aspect of the present invention, the printed circuit patterns include an end-detecting pattern which is disconnected when approximately all of the fluid is discharged from the inner bag.

A container for a fluid defined in the sixth aspect of the present invention is of such a constitution that, in the fourth aspect of the present invention, the printed circuit patterns include a type-detecting pattern which has a predetermined resistance according to the type of the fluid and is disposed on a non-separating area where the inner bag is not separated from the surface.

A container for a fluid defined in the seventh aspect of the present invention is of such a constitution that, in the fourth aspect of the present invention, the carton has a protruding flap portion on which the terminal portions are extended and formed.

A container for a fluid defined in the eighth aspect of the present invention further comprises, in the fourth aspect of the present invention, a terminal device connected to the terminal portions for leading the terminal portions to an outer surface of the carton.

A container for a fluid defined in the ninth aspect of the present invention is of such a constitution that, in the third aspect of the present invention, the separation detecting means includes a magnetic medium of a certain length, the magnetic medium being disposed on a surface of the inner bag facing one of the side surfaces so that the magnetic medium leaves the inner surface of the carton gradually according to the separation of the inner bag.

In order to achieve the above-mentioned object, in the tenth aspect of the present invention, there is provided a fluid level detector using the container for a fluid as defined in the fourth aspect of the present invention, comprising an installation device for placing the carton, the installation device having a suction port for sucking out the fluid through the discharge port and a connector electrically connected with terminals of the printed patterns, a level detecting means for judging and outputting a level of the fluid contained in the inner bag by detecting the resistance.

In order to achieve the above-mentioned object, in the eleventh aspect of the present invention, there is provided a fluid level detector using the container for a fluid as defined in the ninth aspect of the present invention, comprising an installation device for placing the carton, the installation device having a suction port for sucking out the fluid through the discharge port, a magnetic detector disposed on a plane of the installation device which faces the magnetic medium of the carton placed in the installation device, the magnetic detector having a length corresponding with that of the magnetic medium, and the magnetic detector outputting a detecting signal corresponding with a state of the separation, a level detecting means for judging and outputting a level of the fluid contained in the inner bag by the detecting signal from the magnetic detector.

When the carton is set in the installation device, the discharge port is connected with the suction port and the fluid can be taken out. Further, the terminals of the printed circuit patterns are connected to the connector, thereby being electrically connected to the level detecting means.

According to discharging of the fluid from the carton, the inner bag is separated from the surface where the bag is bonded. The printed circuit patterns are disconnected successively according to proceeding of the inner bag separation.

The level detecting means judges and outputs the fluid level in the carton in accordance with changes in resistance that arises from the disconnection of the printed circuit patterns.

DETAILED DESCRIPTION OF PREFERRED EMBODIMENTS

Figure 1:
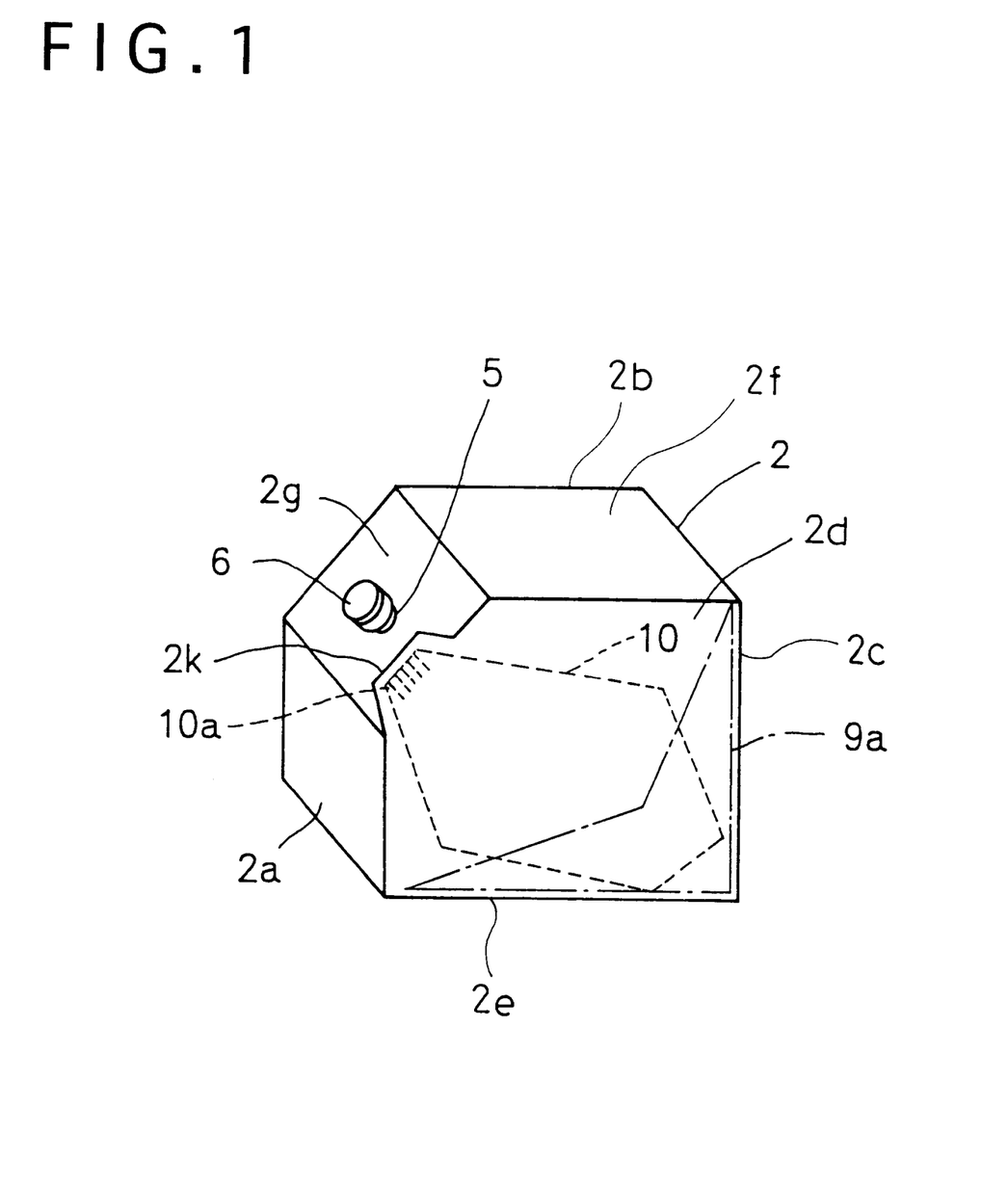
FIG. 1 is a partially cut perspective view showing one embodiment of a bag-in-carton in the present invention.

FIG. 1 is a perspective view showing one embodiment of a bag-in-carton in the present invention. The bag-in-carton comprises a carton 2 in the shape of an approximately rectangular parallelepiped as an outer container and a flexible inner bag 3 disposed within the carton. In the inner bag 3, contents 4 (not shown) like ink and so on are stored.

The carton 2 is formed by providing an inclined surface with a corner where two surfaces of the carton meet. The carton 2 comprises four plane side surfaces 2a, 2b, 2c, 2d, two plane end surfaces 2e, 2f, and the plane inclined surface 2g formed between the end surface 2f and the side surface 2a.

On the inclined surface 2g of the carton, there is provided a discharge port 5 connecting with the inner bag 3. The discharge port 5 is closed with a cap 6.

The protruding height of the discharge port 5 from the carton 2 is determined so that the cap 6 covering the discharge port 5 is within a space sectioned by two extended planes of the side surface 2a and the end surface 2f. Due to the constitution like this, many bag-in-cartons can be placed side by side and piled up in order.

The inner bag 3 is bonded to the inner surface of the carton 2. Namely, among the surfaces shown in the development of FIG. 2, the inner bag 3 is adhered to substantially the whole area of the inclined surface 2g (discharge port attached surface), a pair of side surfaces 2b, 2d which are facing each other and adjacent to the inclined surface 2g, and the side surface 2a adjacent below the inclined surface 2g. Further, the inner bag 3 is also bonded to a part of the side surface 2c among surfaces that are not adjacent to and apart from the inclined surface 2g.

Figure 2:
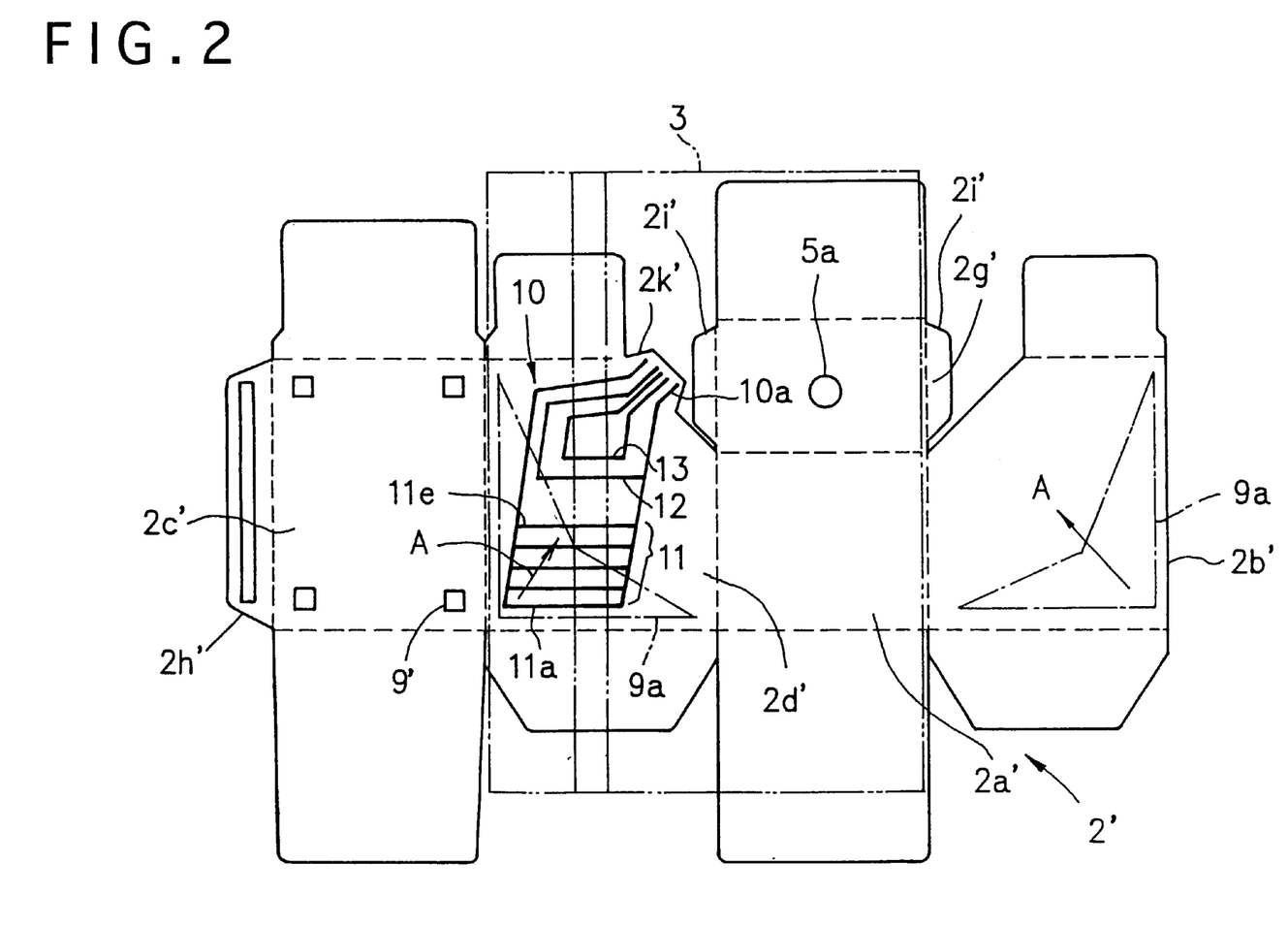
FIG. 2 is a development showing the embodiment of the bagin-carton in the present invention.

In FIG. 2, the whole area of the side surfaces 2a', 2b', 2d', 2g' is specified as adherence area 9 (not shown). In the adherence area, areas sectioned by the alternate long and short dashed lines in the side surfaces 2b', 2d' are specified as separation areas 9a where the bonded inner bag 3 can be separated from the inner surface of the carton 2. Another is non-separation area.

As stated above, the inner bag 3 can be fixed firmly within the carton 2 by making the inner bag 3 adhered to approximately the whole area of the side surface 2a below the inclined surface 2g and by also forming the adherence area 9 on the side surface 2c. Further, the carton 2 and the inner bag 3 are bonded together by an adhesive that allows the inner bag to be separated from the carton. Therefore, according to decrease in the contents 4 of the inner bag 3, the inner bag 3 can be separated from the carton 2 easily. The separation of the inner bag 3 begins at the most distant portion from the discharge port 5 and travels toward this discharge port 5 (in a direction of arrow "A" shown in the figure).

As the adhesive, there is used as an emulsion type adhesive, such as vinyl acetate type, acrylic copolymer type, vinyl acetate acrylic copolymer type, denaturated acrylic ester copolymer type and so on.

The inner bag 3 is adhered to an adherence area of spot pattern 9' on the side surface 2c. While the contents 4 are sucked through the discharge port 5, the inner bag 3 deforms gradually and moves toward the discharge port 5. The inner bag 3 begins to be separated from the side surface 2c which is most distant from the discharge port 5; therefore, and for this purpose the separation of the inner bag 3 from the side surface 2c can be easily achieved by forming the spot pattern 9' in the adherence area. The adherence area of the inner bag 3 on the side surface 2c may be in cubic pattern 9' as shown in FIG. 2 or in rectangular pattern.

On the side surface 2d', there are formed printed circuit patterns 10 with an outline of approximately rhombus shape. The printed circuit patterns 10 are composed of conductive ink printed on the surface. A terminal portion 10a of the printed pattern is disposed on a protruding flap portion 2k' protruding from the side portion of the inclined surface 2g'.

The printed circuit patterns 10 comprise three types of patterns, i.e. a level-detecting pattern 11, an end-detecting pattern 12, and a type-detecting pattern 13.

The conductive ink used herein is composed of conductive filler, binder, solvent, and additives. As the conductive filler, there is used silver powder and copper powder whose conductivity is highest among available materials. Further, as the conductive filler, there may be used gold powder, carbon, carbon black, carbon fiber, nickel powder and so on. As the binder of synthetic resin, there can be mentioned resins such as epoxide, alkyd, acrylic, polyurethane, melamine, phenol vinyl chloride vinyl acetate copolymer and so on. As the solvent, there may be used a medium boiling solvent for screen ink that dissolves these resins. Further, the additives such as dispersant, lubricant, coupling agent and so on are optionally added.

The level-detecting pattern 11 and the end-detecting pattern 12 detect the amount of contents 4. The patterns are so constituted that a part of the patterns are arranged within the separation area 9a on the side surface 2d'.

The level-detecting pattern 11 comprises plural disconnection-patterns 11a–11e that are arranged in parallel and in the separating direction of the inner bag 3 ("A" direction in FIG. 2).

Each of the disconnection patterns 11a–11e is successively separated from the side surface 2d' by the separation of the inner bag 3, which separation starts from the pattern 11a on one end and reaches at the pattern 11e on the other end. Electrical disconnection occurs at a portion where the pattern is separated.

The level-detecting pattern printed on the carton 2 is transferred to the inner bag 3 by adhesion of the adhesive when the inner bag 3 is separated from the carton 2. This causes the electrical disconnection of the printed circuit patterns.

Further, the end-detecting pattern 12 is disposed on such a place where a part of the pattern is separated by the separation of the inner bag 3 when the contents 4 of the inner bag 3 is completely taken out. Namely, a part of the end-detecting pattern 12 is arranged on an end portion of the separation area 9a in the separating direction A.

On the other hand, type-detecting pattern 13 is formed outside the separating area 9a, having a certain resistance "r" according to the discriminating information of the carton 2.

The resistance "r" is determined according to types (color etc. of ink) of contents 4 in the carton 2. Value variations of the resistance "r" can be made by varying width or thickness of a printing pattern.

Since the type-detecting pattern 13 is disposed outside the separating area 9a, the type-detecting pattern 13 is not cut even when the separation state of the inner bag or the amount of the contents 4 change, thereby outputting the proper resistance "r".

Next, as shown in FIG. 2, a board is cut in a certain outline to make a carton blank 2' for forming a carton. The bag-in-carton thus explained is formed by using the carton blank. On the inner surface of panels 2a', 2b', 2c', 2d', and 2g' of this carton blank 2', which will be the side surface 2a, 2b, 2c, 2d, and the inclined surface 2g of the carton 2, there is provided the adherence area 9.

The adhesive is applied to the adherence area 9 that is formed on the whole area of the panels 2a', 2b', 2c', 2d', and 2g' of the carton blank 2. Further, the adhesive is applied to the adherence area 9 that is formed on a part of the panel 2c' and an overlap width 2h'. The overlap widths 2i' and 2h' of the carton blank 2' are the portions that are to be folded inside when the carton is formed. On the overlap widths 2i' and 2h', the adhesive is also applied to.

The inner bag 3 is adhered to the panels 2a', 2d', and 2g' of the carton blank 2' by using the adhesive. Next, the carton blank is formed in an approximately rectangular parallelepiped by folding the panels and the overlap widths along the dashed line.

After a discharging hole 5a for the discharge port is cut, the discharge port 5 is attached there. Finally, the contents 4 such as ink and so on are charged and the state shown in FIG. 1 is obtained.

The carton 2 containing ink is set on an installation device in a printing apparatus.

The installation device comprises a suction port that is to be connected to the discharge port 5. Further, a connector 14a is disposed in such a manner that it faces the protruding flap portion 2k. The connector 14a is of use for electrically connecting the terminal portion 10a of the printed circuit patterns 10 with a level detecting means 14 explained later.

Figure 3:
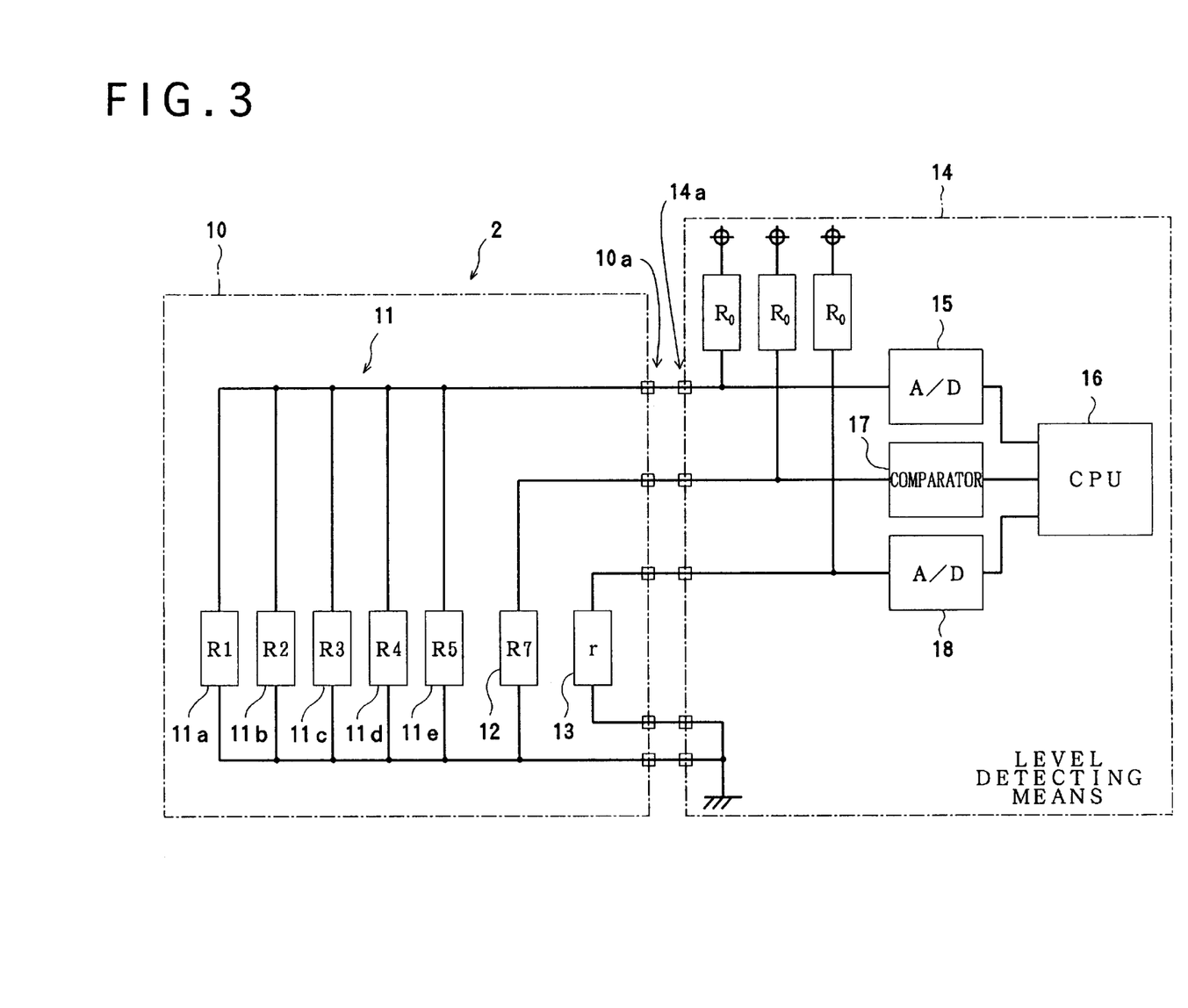
FIG. 3 is a circuit diagram of printed circuit patterns and a level detecting means of the embodiment in the present invention.

FIG. 3 is showing a circuit constitution of the level detecting means 14 and the printed circuit patterns 10.

An electric source with a certain voltage provides the level-detecting pattern 11 with electricity through a voltage divider $R_0$. An A/D converter 15 is supplied with a voltage on the basis of voltage dividing proportion of the resistance of the voltage divider $R_0$ to the parallel resistance of each of the disconnection patterns 11a–11e.

The voltage supplied with the A/D converter changes according to the number of disconnection occurred in the disconnection patterns 11a–11e. This changeable voltage is converted into digital form and output to a processing means (CPU) 16.

The end-detecting pattern 12 is connected with a comparator 17. The comparator 17 outputs a binary signal to the CPU 16 according to whether the end-detecting pattern 12 is disconnected.

The type-detecting pattern 13 is connected with the A/D converter 18. The A/D converter 18 converts a voltage according to the resistance of the type-detecting pattern 13 into digital form and outputs the converted voltage in digital form to the CPU 16.

The electric source provides the end-detecting pattern 12 and the type-detecting pattern 13 with electricity through the voltage dividers $R_0$, $R_0$ Input terminals of the comparator 17 and the A/D converter 18 are connected with the voltage dividing points in these voltage dividers $R_0$,$R_0$.

The processing means (CPU) 16 detects and outputs the amount of the contents 4 in accordance with digital value output from the A/D converter 18.

Namely, the disconnection patterns 11a–11e are successively disconnected in accordance with discharging of the contents 4 (i.e. the state of separation of the inner bag 3 inside the carton 2). The A/D converter 15 receives the divided voltage output, which is derived from changes in parallel resistance of whole resistances $R_1$–$R_5$. Responding to the inputting, the A/D converter 15 outputs digital values.

Of course, the whole resistance increases as the disconnection patterns 11a–11e are disconnected successively.

The CPU 16 regularly judges the amount of the contents in accordance with changes in the digital value output by the A/D converter 15.

Further, the CPU 16 detects whether the end-detecting pattern 12 is disconnected according to the output from the comparator 17. On receiving the output when the end-detecting pattern 12 is disconnected, the CPU 16 judges that the contents 4 are consumed.

Further, the CPU 16 discriminates among the types of the carton 2 according to the digital value output from the A/D converter 18. Namely, the CPU 16 identifies the digital value among type information pre-stored in a memory according to plural types of the carton 2.

Figure 4:
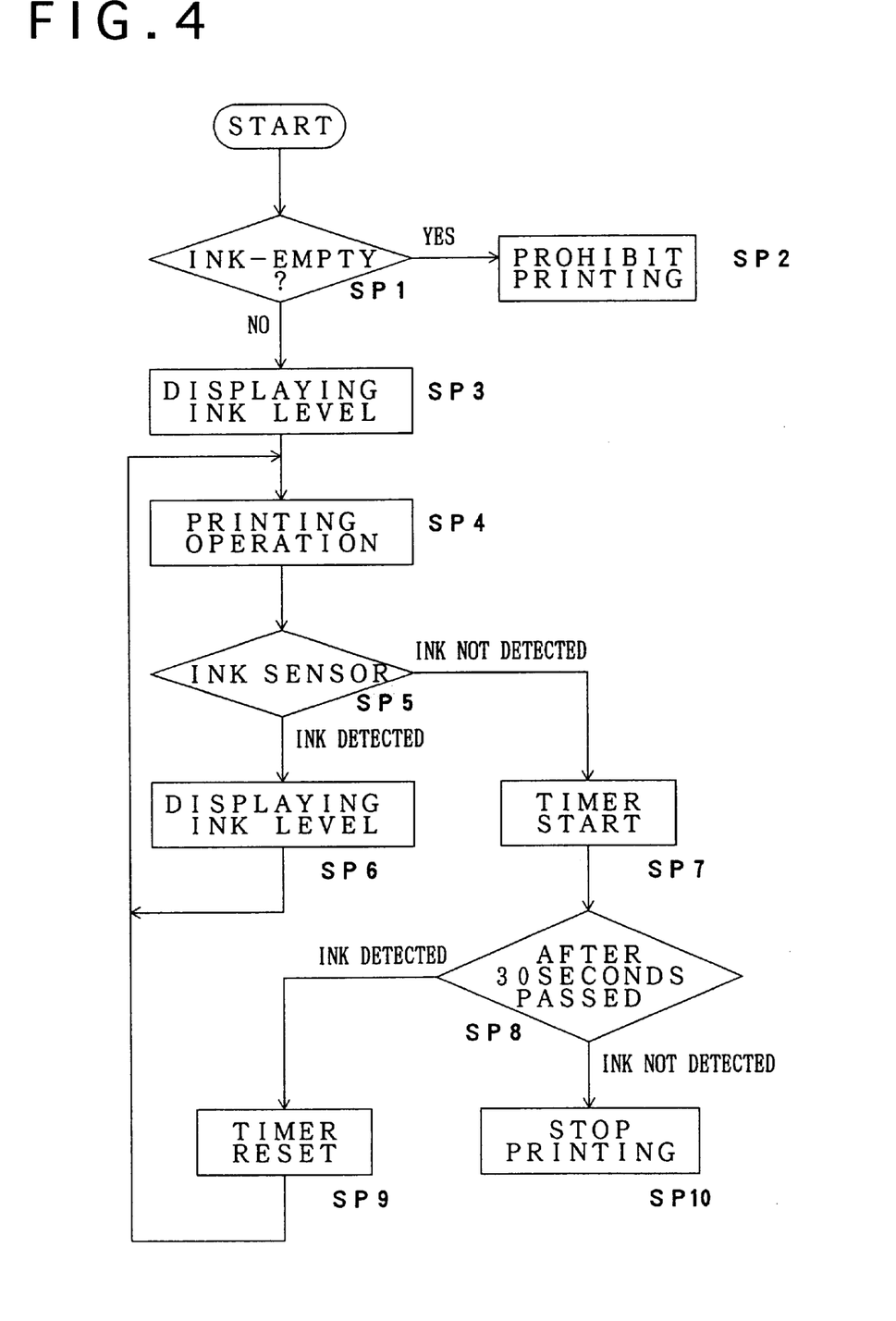
FIG. 4 is a flow chart showing the operation of the embodiment in the present invention.

Explanation will next be made to the function of the constitution stated above with reference to FIG. 4.

In the processing steps of the drawing, the explanation is based on the premise that the contents 4 of the carton 2 is ink and the level detecting means 14 is disposed inside a printing apparatus.

When the carton 2 is installed in the apparatus, the CPU 16 judges the type of the ink in accordance with an output from the A/D converter 18.

The resistance "r" of the type-detecting pattern 13 inside the carton 2 is arranged as a value according to the type of the ink. On receiving a digital value in accordance with the resistance "r", the CPU 16 selects a corresponding ink-type among type-information stored in the memory and outputs the same. This selection output is displayed on a display of the printing apparatus.

Further, the CPU 16 detects whether the end-detecting pattern 12 is disconnected according to the output from the comparator 17 (SP1). When a binary signal from the comparator 17 shows that the end-detecting pattern 12 is disconnected, the CPU 16 judges that there is no ink stored (SP1-YES), and printing is prohibited. At the same time, an indication that the carton 2 should be exchanged is displayed on a display.

Meanwhile, when a binary signal from the comparator 17 shows that the end-detecting pattern 12 is not disconnected, the CPU 16 judges that there is still ink stored (SP1-NO).

Later the level of the ink stored is judged according to the digital value output from the A/D converter 15, and the ink level data is output on the display (SP3). This judgement and processing is based on the digital value that is output in accordance with the disconnection state of the disconnection patterns 11a–11e in the level-detecting pattern 11.

Then, the CPU 16 sets the apparatus to be workable for printing and executes corresponding printing operation after deciding the sheet number to be printed (SP4).

An ink sensor equipped with the printing apparatus judges whether the discharged ink from the carton 2 exists or not (SP5). As stated before, the ink sensor detects the diameter of the ink-whirl inside the apparatus by measuring the capacitance thereof. When the amount of the ink is not sufficient, supplementary ink is sucked and supplied.

During printing, if the ink sensor detects ink ("INK DETECTED" at SP5), the ink level data judged at the CPU 16 may be displayed on the display. While the ink sensor detects ink, the printing operation continues (Return to SP4).

During printing, if the ink sensor does not detect ink ("INK NOT DETECTED" at SP5), the CPU 16 starts an internal timer and drives a motor to begin sucking of ink inside the carton 2 (SP7). After the timer counts a certain amount of time (30 seconds, for example), if the ink sensor detects ink ("INK DETECTED" at SP8), the timer is reset (SP9) and the printing operation continues (return to SP4).

However, if the ink sensor does not detect ink ("INK NOT DETECTED" at SP8) after the timer count, the printing operation is stopped (SP10). At the same time, this is displayed.

According to the constitution thus stated, the type and the level of ink in the carton 2 and the carton emptiness can be displayed immediately after the carton 2 is set in the printing apparatus. Consequently, even in the case where an operator mistakenly sets a used carton 2, this can be exchanged for another carton 2 without delay.

Further, approximate ink-level can be confirmed with the carton 2 installed inside the apparatus. Therefore, detaching the carton 2 from the apparatus is not required for ink-level confirmation.

Further, if the carton 2 contains a certain level of ink that enables printing, the ink can be completely consumed at the printing apparatus.

When the ink is used up, the CPU 16 may give alarm by a buzzer and so on except by the display.

Figure 5:
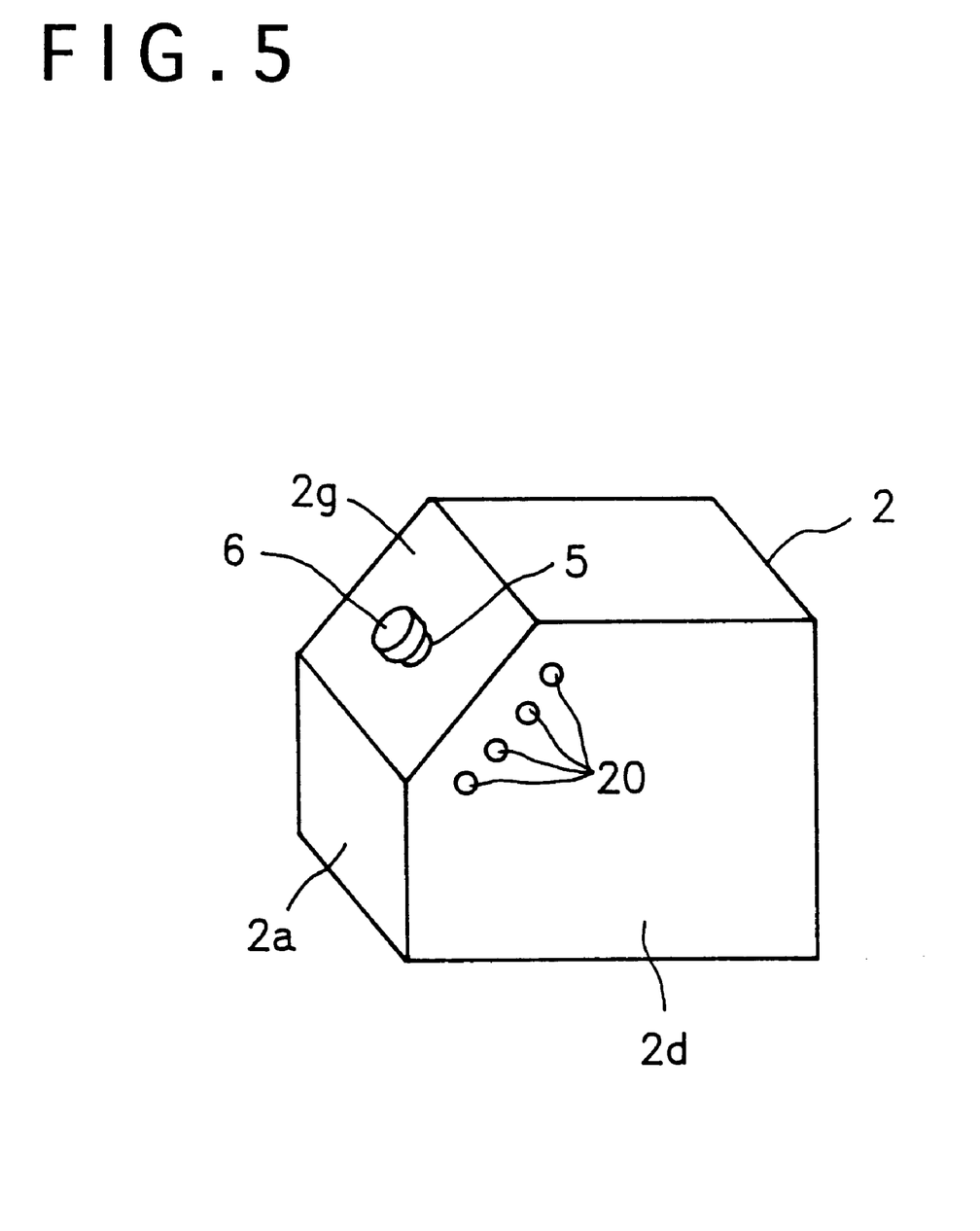
FIG. 5 is a perspective view showing another embodiment of a bag-in-carton in the present invention.

FIG. 5 shows another embodiment of a carton 2. As illustrated in this drawing, there is no protruding flap portion 2k on the carton 2. On the side surface 2d, the terminal portions 10a of the printed circuit patterns 10 are arranged adjacent to the discharge port 5 (the inclined surface 2g). The connectors 20 are disposed over the terminal portions 10a. The connectors 20 are piercing the side surface 2d, thereby connecting with the terminal portions 10a. The connectors 20 may be formed with metal.

In the installation device of the printing apparatus, there are provided another connectors in accordance with the positions of the connectors 20.

Figure 9:
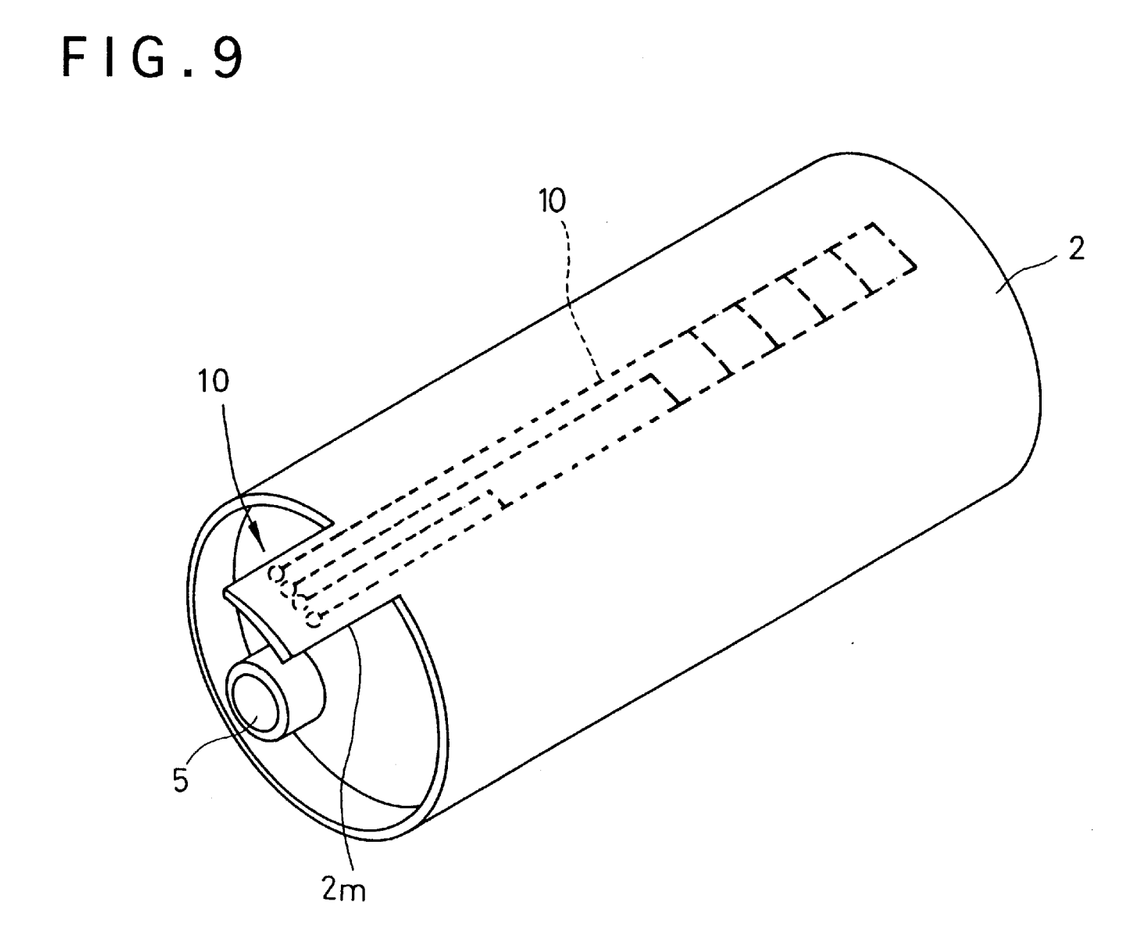
FIG. 9 is a perspective view showing still another embodiment of a bag-in-carton in the present invention.

FIG. 9 shows still another embodiment of a carton 2. As illustrated in this drawing, this carton 2 is cylindrical. The carton 2 has an inner bag 3 with a discharge port 5. The inner bag is bonded to the inner surface of the carton 2.

Printed circuit patterns 10 are printed on the inner surface of the carton 2. A protruding flap portion 2m is integrally formed with a cylinder wall of the carton 2. The printed circuit patterns 10 are led outside the carton 2 and connected with terminals disposed on the flap 2m. The printed circuit patterns 10 are transferred to the inner bag 3 when the bag 3 is separated from the carton 2. The printed circuit patterns 10 are disconnected at the transferred portion. Adhesive strength of the inner bag to the carton 2 is arranged in such a manner that the strength in discharge port side in a direction of the axis of the carton 2 is higher than that of the opposite side. Therefore, the inner bag starts to separate from the carton at the opposite side to the discharge port side.

According to the sucking, the disconnection patterns are successively broken by previously forming the printed circuit patterns 10 as illustrated in FIG. 2. The terminal portions of the printed circuit patterns 10 that extend from the inside of the carton are arranged on the flap portion 2m. When the carton 2 is attached to the apparatus, the flap portion 2m is connected with the level detecting means. Similarly, when the carton 2 is detached, the flap is disconnected.

Explanation will next be made to another embodiment of the present invention.

In the explanation of the aforementioned embodiment, conductive printed circuit patterns 10 are printed on the inside of the carton 2 to form an electrical circuit, and the printed circuit patterns 10 are electrically connected with the apparatus side through the terminals 10a or the connector 20.

In the next embodiment, another constitution for detecting the inside liquid level will be explained. This requires no electrical connection such as the printed circuit patterns 10, the terminals 10a, and the connector 20.

Figure 6:
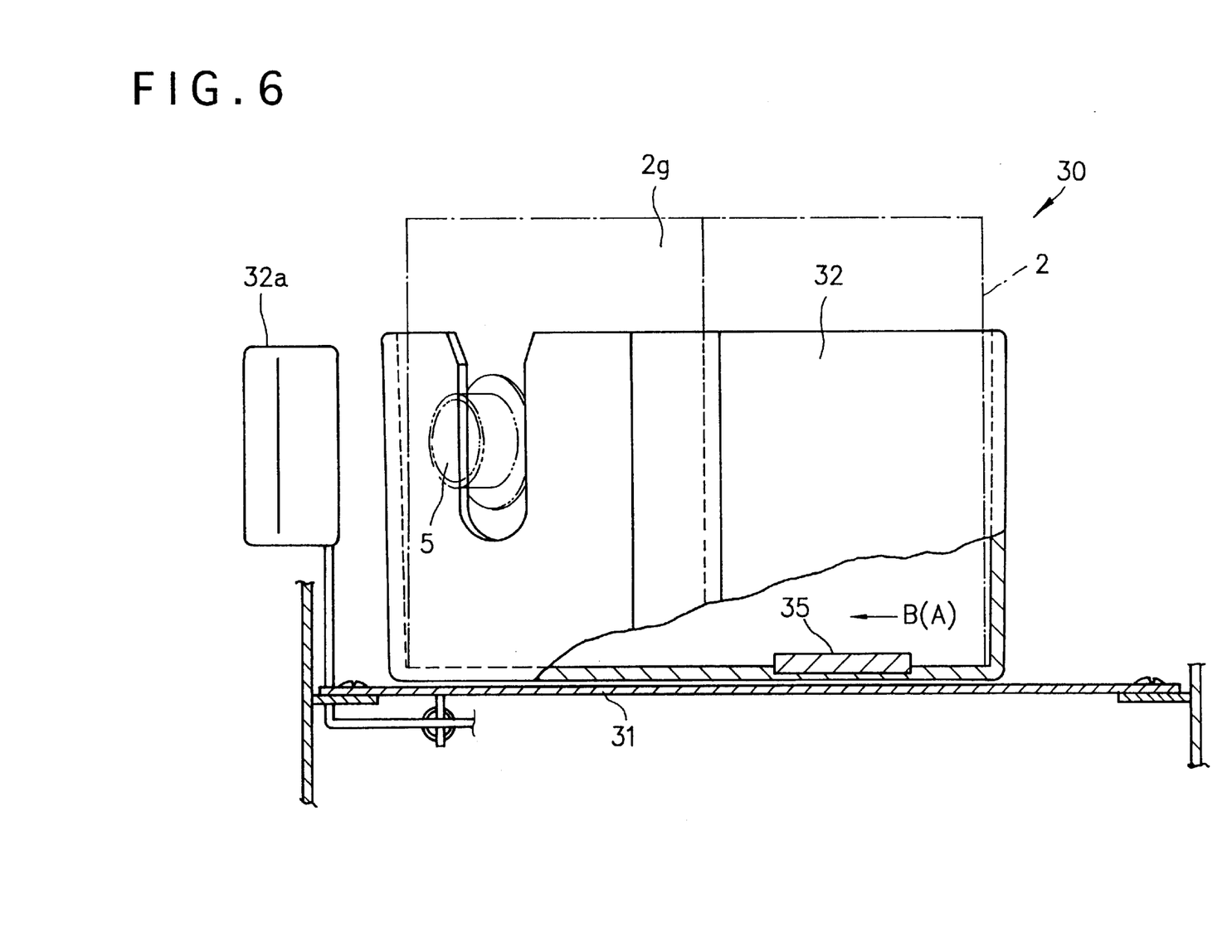
FIG. 6 is a side view, partially sectioned, of an installation device.
Figure 7:
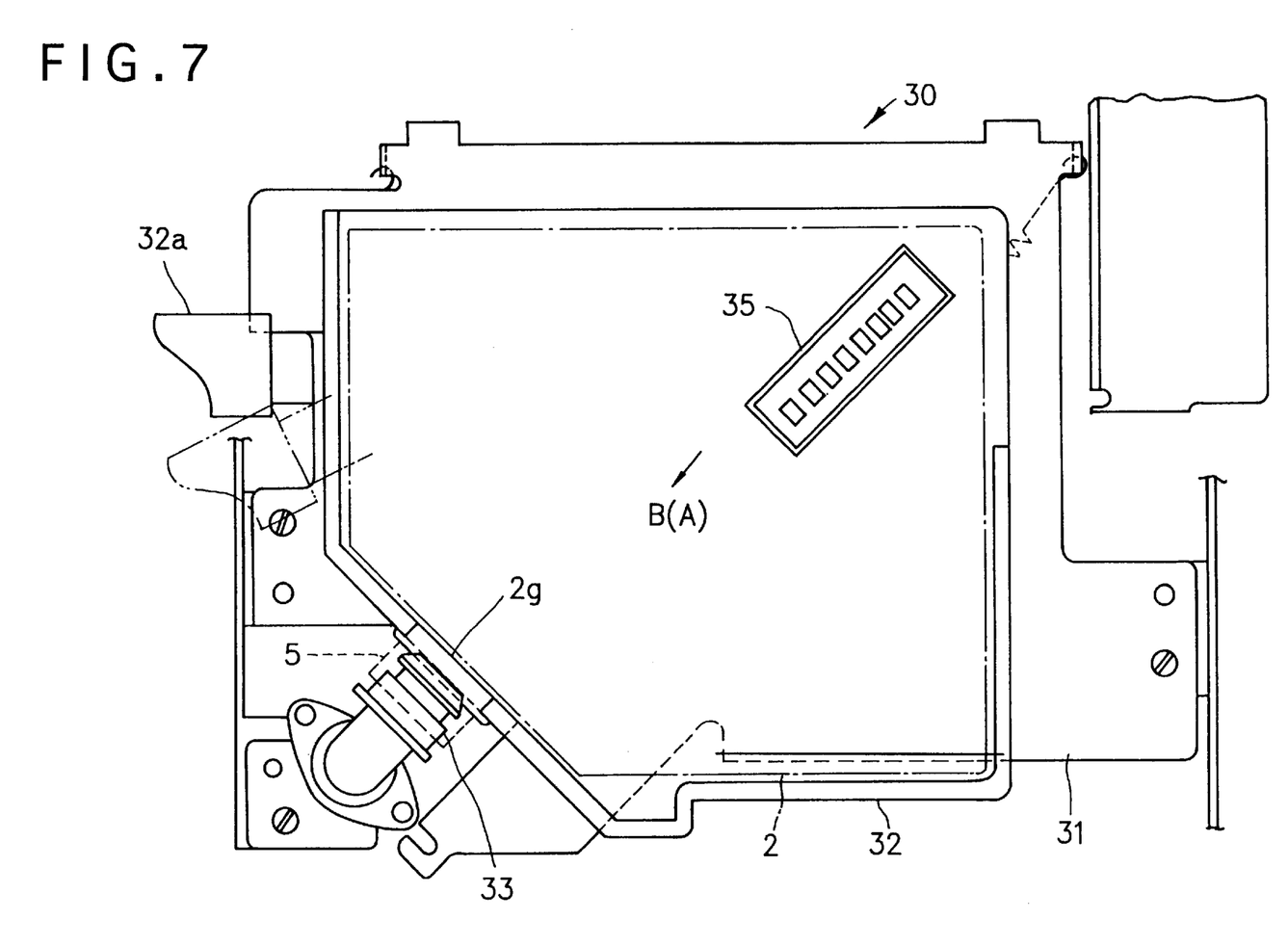
FIG. 7 is a plan view of the installation device.

FIG. 6 is a partially sectioned side view of an installation device 30. FIG. 7 is a plan view of the same.

The installation device 30 comprises a table 31 and a holder 32. The holder 32 can move in the direction "B" of FIG. 6 with respect to the table 31. The inner-shape of the holder 32 corresponds with the outer-shape of the carton 2. The carton 2 is installed downwardly inside the holder 32. The holder 32 holds the carton 2 in a position that the discharge port 5 directs horizontally.

The holder 32 is transferred in the direction "B" by operating a lever 32a, so that the discharge port 5 is connected to a suction port 33. FIG. 7 shows the suction port 33 connected with the discharge port 5 of the carton 2.

A magnetic detector 35 is disposed on the bottom of the holder 32 in the direction "B". The direction "B" coincides with the separating direction "A" of the inner bag 3 inside the carton 2.

Figure 8:
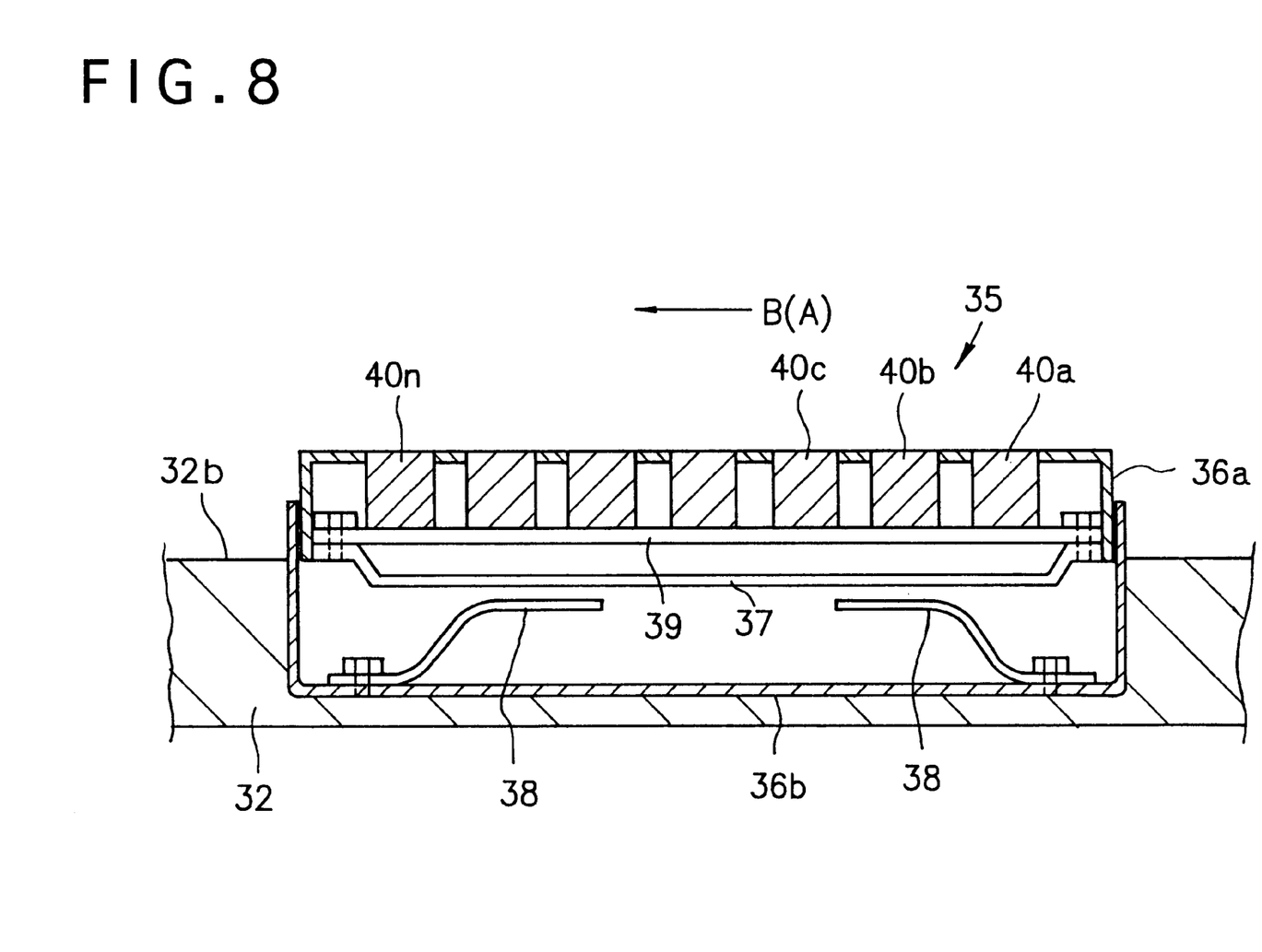
FIG. 8 is a cross sectional view of a magnetic detector.

FIG. 8 is a cross sectional view of the magnetic detector 35.

The magnetic detector 35 is included in an upper and lower cases 36a and 36b. A support plate 37 is secured to the upper case 36a. A spring 38 is secured to the lower case 36b. The spring 38 elastically supports the support plate 37 in a certain level so that the upper case 36a can move vertically. The spring 38 may be a leaf spring as illustrated in the drawing. The spring 38 and the plate 37 are illustrated as being apart in FIG. 8 to show these parts are unconnected with each other.

A printed board 39 is disposed over the support plate 37. On the printed board 39, plural magnetic sensors 40 (40a–40n) are arranged in a straight line.

An upper detecting surface of each magnetic sensor 40 is exposed to the outside of the cases. The magnetic sensor outputs a detecting signal in accordance with the distance from a magnetic medium. The detecting signal is output to the processing means (CPU) 16 of the level detecting means.

The lower case 36b of the magnetic detector 35 is fixed to the bottom of the holder 32, so that the upper surface of the case 36a is protruding upwardly beyond the upper plane 32b. When the carton 2 presses the magnetic detector 35 downwardly, the upper surface of the case 36a is lowered to the same level as the upper plane 32b.

By the way, the carton 2 for use in this embodiment has no printed circuit patterns 10 explained before. Instead, the carton 2 has the magnetic medium that is printed or applied on the inner bag 3 just over the magnetic detector 35. The magnetic medium is approximately the same length of the magnetic sensors 40a–40n. The end portion of the magnetic medium is a little behind the end portion of the inner bag in the separating direction "A". Beneath the end portion of the magnetic medium, there is arranged the magnetic sensor 40n.

Consequently, when the carton 2 is installed in the installation device 30, the magnetic medium is placed over the magnetic detecting means 35 having the carton 2 therebetween. Therefore, all of the magnetic sensors 40a–40n of the magnetic detecting means 35 can detect magnetism of the magnetic medium.

The ink level in the carton 2 can be detected according to the separation of the inner bag 3 from the carton 2.

Namely, the inner bag 2 starts to be separated from the carton 2, responding to sucking and discharging ink from the inner bag 3. At first, the inner bag 3 starts to move above the magnetic sensor 40a in a direction leaving the magnetic sensor 40a behind. In accordance with the inner bag movement, the magnetic sensor 40a soon is unable to detect the magnetic medium.

Later, the magnetic sensors 40b–40n soon get unable one by one to detect the magnetic medium in accordance with discharging ink.

The CPU 16 judges the ink level in accordance with the detecting signals input from the magnetic sensors 40a–40n. Namely, the ink level is judged as full when all of the magnetic sensors 40a–40n detect the magnetic medium. Later, responding to the state that the magnetic sensors 40a–40n get unable one by one to detect the magnetic medium, the CPU 16 then judges the ink level. The ink level is judged as empty when the magnetic sensor 40n get unable to detect the magnetic medium.

According to the bag-in-carton in the present invention, the inner bag is separated from the inner surface of the carton in a certain direction in accordance with development in discharging a high-viscosity liquid. Since the separation detecting means is arranged in accordance with the separating direction, the separating state of the inner bag can be easily recognized and the liquid level can be judged according to the separating state.

When the separation detecting means includes the plural printed circuit patterns and the electrodes are so constituted that they are disconnected successively in accordance with the separation development of the inner bag, the separating state and the liquid level can be detected according to changes in electrical characteristics between the both terminals of the electrodes.

Further, if the printed circuit patterns include the end-detecting pattern, when the whole liquid is consumed, this is detected by disconnection in the end-detecting pattern.

Further, if the printed circuit patterns include the type-detecting pattern whose resistance corresponds to the type of the liquid and the pattern is formed on a non-separating area where the inner bag is not separated from the surface even when the whole liquid is consumed, the liquid type can be recognized through detecting the resistance of the end-detecting pattern.

Further, if the terminals of the printed circuit patterns are extended and formed on the protruding flap portion, the external connection of the electrodes can be easily achieved. If the connector is provided through the side surface of the carton, the printed circuit patterns can be guided outside without the flap.

The separation detecting means may be the magnetic medium with a certain length formed on the separating portion of the inner bag. Since the magnetic medium moves in a direction leaving the inner surface of the carton behind in accordance with the inner bag separation, the separating state and the liquid level can be detected by detecting the movement of the magnetic medium.

Thus, according to the bag-in-carton, the inner liquid level can be detected without forming an opening that lowers rigidity of the carton itself.

The fluid level detector using the bag-in-carton comprises the connector and the level detecting means. The connector electrically connects with the terminals of the printed circuit patterns. The level detecting means detects the liquid level contained in the inner bag by detecting changes in the electrode resistance according to the electrode disconnection.

In this way, the liquid level can be confirmed just by installing the carton in the installation device. When a used carton is mistakenly set in the installation device, this can be immediately recognized and measures such as the carton exchange can be made without delay. Therefore, the stop time of the apparatus due to an installation error can be decreased, which improves the efficiency in using the apparatus.

Further, in another embodiment of the present invention, the fluid level detector using another bag-in-carton comprises the magnetic detector. The magnetic detector is disposed on the plane that is facing the magnetic medium of the carton installed in the installation device. The magnetic detector has the length corresponding to the length of the magnetic medium. The magnetic detector outputs the detecting signal corresponding to separating state of the inner bag. Due to such constitution, the liquid level can be detected just by installing the carton without the connector in the installation device.

What is claimed is:

1. A container for a fluid comprising:
   a hollow carton having an inner surface,
   a flexible inner bag disposed in the carton and attached to said inner surface of said carton for containing said fluid therein, said inner bag having a discharge port for discharging said fluid and being separated in a predetermined separating direction from said inner surface of said carton as said fluid filled in the flexible inner bag is discharged through said discharge port, and
   separation detecting means situated between the inner surface of the carton and the flexible inner bag, said separation detecting means being arranged along said separating direction so that the separation detecting means is gradually separated from said inner surface according to the discharging of the fluid.

2. A container for a fluid according to claim 1, wherein said carton is in a cylindrical shape having an opening on one end thereof, said discharge port of said inner bag is disposed at said opening of said carton, and said separating direction is parallel to an axis of the carton.

3. A container for a fluid according to claim 1, wherein said separation detecting means is fixed to the flexible inner bag so that as the flexible inner bag is separated from the inner surface according to the discharging of the fluid, the separation detecting means indicates a length of separation of the flexible inner bag from the inner surface.

4. A container for a fluid comprising:
   a substantially box shaped carton including a pair of side surfaces,
   a discharge port disposed on a surface of said carton,
   a flexible inner bag formed separately from said carton and disposed inside said carton for containing said fluid therein to be connected to said discharge port, said inner bag being attached to said carton in substantially whole areas of said pair of side surfaces which face each other and are located adjacent to a surface where said discharge port is disposed, and being gradually separated from said pair of side surfaces in a predetermined separating direction as said fluid filled in the flexible inner bag is discharged through said discharge port, and
   separation detecting means situated between one of said pair of side surfaces and the flexible inner bag, said separation detecting means being arranged along said separating direction so that as the inner bag is gradually separated from the one of the pair of side surfaces according to the discharging of the fluid., the separation detecting means is gradually separated from the one of the pair of side surfaces along said separating direction to thereby indicate a remaining amount of the fluid in the inner bag.

5. A container for a fluid according to claim 4, wherein said separation detecting means includes electrical printed circuit patterns which have predetermined resistances respectively and common terminal portions, said printed circuit patterns being disposed parallel on the one of said pair of side surfaces so that said printed circuit patterns are disconnected gradually according to separation of said inner bag.

6. A container for a fluid according to claim 5, wherein said printed circuit patterns include an end-detecting pattern which is disconnected when approximately all of said fluid is discharged from said inner bag.

7. A container for a fluid according to claim 5, wherein said printed circuit patterns include a type-detecting pattern which has a predetermined resistance according to the type of said fluid and is disposed on a non-separating area where said inner bag is not separated from the side surface.

8. A container for a fluid according to claim 5, wherein said carton has a protruding flap portion on which said terminal portions are extended and formed.

9. A container for a fluid according to claim 5, further comprising a terminal device connected to said terminal portions for leading said terminal portions to an outer surface of said carton.

10. A fluid level detector using said container for a fluid as claimed in claim 5, said fluid level detector comprising:
    an installation device for placing said carton, said installation device having a suction port for sucking said fluid through said discharge port and a connector electrically connected with terminals of said printed circuit patterns,
    level detecting means for judging and outputting a level of said fluid contained in said inner bag by detecting said resistance.

11. A container for a fluid according to claim 4, wherein said separation detecting means includes a magnetic medium of a certain length, said magnetic medium being disposed on a surface of said inner bag facing one of said pair of side surfaces so that said magnetic medium leaves said inner surface of said carton gradually according to separation of said inner bag.

12. A fluid level detector using said container for a fluid as claimed in claim 11, said fluid level detector comprising:
    an installation device for placing said carton, said installation device having a suction port for sucking said fluid through said discharge port, a magnetic detector disposed on a plane of said installation device which faces said magnetic medium of said carton placed in said installation device, said magnetic detector having a length corresponding with that of said magnetic medium, and said magnetic detector outputting a detecting signal corresponding with the separation, and level detecting means for judging and outputting a level of said fluid contained in said inner bag by said detecting signal from said magnetic detector.

13. A container for a fluid according to claim 4, wherein said separation detecting means is fixed to the flexible inner bag and the one of the pair of inner surfaces of the carton so that the flexible inner bag is gradually separated from the one of the pair of inner surfaces along the separating direction as the fluid is discharged from the inner bag.

14. A combination comprising a container for a fluid and a fluid level detector, said container including:

a hollow carton having an inner surface, a flexible inner bag disposed in the carton and attached to said inner surface of said carton for containing said fluid therein, said inner bag having a discharge port for discharging said fluid and being separated in a predetermined separating direction from said inner surface of said carton as said fluid filled in the flexible inner bag is discharged through said discharge port, and separation detecting means situated between the inner surface of the carton and the flexible inner bag, said separation detecting means being arranged along said separating direction so that the separation detecting means is gradually separated from said inner surface according to the discharging of the fluid, and said fluid level detector including level detecting means attached to the separation detecting means so that a separating condition of said inner bag is recognized through the separation detecting means to thereby judge a fluid level in the inner bag.

* * * * *